United States Patent Office 2,937,119
Patented May 17, 1960

2,937,119

N-MONOSUBSTITUTED-2,2-DIALKYL-1,3-PROPANEDIOL DICARBAMATES

Frank M. Berger, Princeton, and Bernard J. Ludwig, North Brunswick, N.J., assignors to Carter Products, Inc., New York, N.Y., a corporation of Maryland No Drawing. Application June 11, 1959
Serial No. 819,552

7 Claims. (Cl. 167—65)

This invention relates to novel organic compounds and has for its object the provision of new compounds possessing muscle relaxant action of high activity.

Prior to this invention, many drugs have been used for the purpose of relieving muscle spasm caused by different disorders, such for example, as rheumatic and related disorders, cerebral palsy, and various neurological conditions. For many years, salicylates were used for this purpose but they were not generally effective for they relieved aching discomfort for only a short time. Later, mephenesin (3-o-toloxy-1,2-propanediol) became widely used in a variety of conditions where muscle spasm is a factor. The very short duration of action of mephenesin is its greatest drawback. The most recent drug which has had wide acceptance for relieving muscle spasm is meprobamate (2-methyl-2-n-propyl-1,3-propanediol dicarbamate). The muscle relaxant action of meprobamate is similar to that of mephenesin but of greater potency and longer duration.

This invention is based on the discovery that certain novel compounds, and more particularly certain N-monosubstituted-2,2-dialkyl-1,3-propanediol dicarbamates, possess strong muscle relaxant activity. The invention also includes novel methods for producing N-substituted dicarbamates exemplified by the novel compounds of this invention. In the present specification and claims, the term "propyl" means normal (n) propyl.

The novel compounds of this invention are disclosed in the following Table I, which is as follows:

TABLE I

*N-monosubstituted-2,2-dialkyl-1,3-propanediol dicarbamates*

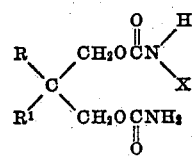

| X | R | R¹ | Formula | Analysis N. Calc. | Analysis N. Found | $n_D^{25}$ | M.P., °C, or Dist. temp., °C, and pressure, mm. | $PD_{50}$ | $LD_{50}$ |
|---|---|---|---|---|---|---|---|---|---|
| propyl | methyl | ethyl | $C_{11}H_{22}O_4N_2$ | 11.38 | 11.37 | | M.P., 71.5–73.5 | 165 | 580 |
| isopropyl | do | do | $C_{11}H_{22}O_4N_2$ | 11.38 | 11.08 | | M.P., 86–88 | 130 | 730 |
| n-butyl | do | do | $C_{12}H_{24}O_4N_2$ | 10.76 | 10.70 | 1.4682 | 120–125 (0.001) | 136 | 570 |
| allyl | do | do | $C_{11}H_{20}O_4N_2$ | 11.45 | 11.74 | | M.P., 51–52 | 180 | 510 |
| ethyl | do | propyl | $C_{11}H_{22}O_4N_2$ | 11.38 | 11.06 | 1.4677 | 154–156 (0.05) | 170 | 700 |
| propyl | do | do | $C_{12}H_{24}O_4N_2$ | 10.76 | 10.71 | 1.4694 | 144–147 (0.02) | 146 | 790 |
| isopropyl | do | do | $C_{12}H_{24}O_4N_2$ | 10.76 | 10.76 | | M.P., 89–91 | 153 | 790 |
| n-butyl | do | do | $C_{13}H_{26}O_4N_2$ | 10.21 | 10.42 | | M.P., 49–51 | 94 | 514 |
| isobutyl | do | do | $C_{13}H_{26}O_4N_2$ | 10.21 | 10.47 | 1.4645 | 100–110 (0.01) | 175 | >940 |
| allyl | do | do | $C_{12}H_{22}O_4N_2$ | 10.85 | 11.03 | 1.4760 | 110–130 (0.25) | 114 | 500 |
| propargyl | do | do | $C_{12}H_{20}O_4N_2$ | 10.93 | 11.34 | | M.P., 94–96 | 172 | 650 |
| isopropyl | do | isopropyl | $C_{12}H_{24}O_4N_2$ | 10.76 | 10.98 | | M.P., 57–58 | 130 | 760 |
| n-butyl | do | do | $C_{13}H_{26}O_4N_2$ | 10.21 | 9.96 | | M.P., 63–65 | 160 | 560 |
| allyl | do | do | $C_{12}H_{22}O_4N_2$ | 10.85 | 11.20 | 1.4824 | 120–125 (0.02) | 197 | 530 |
| methyl | do | n-butyl | $C_{11}H_{22}O_4N_2$ | 11.38 | 11.30 | | M.P., 75–77 | 160 | 515 |
| propyl | do | do | $C_{13}H_{26}O_4N_2$ | 10.21 | 10.49 | | M.P., 62–64 | 114 | 532 |
| isopropyl | do | do | $C_{13}H_{26}O_4N_2$ | 10.21 | 10.23 | | M.P., 60–61 | 102 | 840 |
| allyl | do | do | $C_{13}H_{24}O_4N_2$ | 10.28 | 10.20 | | M.P., 62–63 | 136 | 345 |
| propargyl | do | do | $C_{13}H_{22}O_4N_2$ | 10.36 | 10.29 | | M.P., 55–57 | 136 | 345 |
| propyl | do | sec.-butyl | $C_{13}H_{26}O_4N_2$ | 10.21 | 10.20 | | M.P., 61–63 | 195 | 620 |
| isopropyl | do | do | $C_{13}H_{26}O_4N_2$ | 10.21 | 10.47 | | M.P., 78–80 | 90 | 555 |
| allyl | do | do | $C_{13}H_{24}O_4N_2$ | 10.28 | 10.15 | 1.4830 | 120–125 (0.002) | 102 | 344 |
| propargyl | do | do | $C_{13}H_{22}O_4N_2$ | 10.36 | 10.10 | 1.4862 | 120–125 (0.001) | 171 | 510 |
| propyl | ethyl | ethyl | $C_{12}H_{24}O_4N_2$ | 10.76 | 10.96 | | M.P., 83–84 | 147 | 760 |
| isopropyl | do | do | $C_{12}H_{24}O_4N_2$ | 10.76 | 10.83 | | M.P., 91–93 | 130 | 1,280 |
| allyl | do | do | $C_{12}H_{22}O_4N_2$ | 10.83 | 10.64 | | M.P., 84–85 | 205 | 330 |
| isopropyl | do | propyl | $C_{13}H_{26}O_4N_2$ | 10.21 | 10.51 | | M.P., 82–84 | 225 | 880 |
| isopropyl | do | isopropyl | $C_{13}H_{26}O_4N_2$ | 10.21 | 10.23 | | M.P., 72–74 | 120 | 730 |
| methyl | do | n-butyl | $C_{12}H_{24}O_4N_2$ | 10.76 | 10.78 | | M.P., 74–76 | 170 | 509 |
| propargyl | do | do | $C_{14}H_{24}O_4N_2$ | 9.85 | 9.71 | | M.P., 61–64 | 153 | 510 |

The novel compounds of this invention possess unexpected muscle relaxant activity. In order to show the unexpected muscle relaxant activity of the compounds of this invention, the mean paralyzing dose ($PD_{50}$) and the mean lethal dose ($LD_{50}$) for each of the compounds of this invention, when administered interperitoneally to mice, are reported in Table I. The $PD_{50}$ and $LD_{50}$ doses or values are expressed in milligrams (mgs.) of active ingredient per kilogram (kg.) of mouse. In the following Table II, there are given corresponding $PD_{50}$ and $LD_{50}$ values for a number of N-monosubstituted-2-alkyl or 2,2-dialkyl-1,3-propanediol dicarbamates which possess inferior muscle relaxant activity when compared to the compounds of this invention. In the following Table III, there are given corresponding $PD_{50}$ and $LD_{50}$ values for a number of N, N or N, $N^1$ disubstituted, N, N, $N^1$ trisubstituted and N, N, $N^1$, $N^1$ tetrasubstituted 2-alkyl or 2,2-dialkyl-1,3-propanediol dicarbamates which possess inferior muscle relaxant activity when compared to the compounds of this invention.

TABLE II

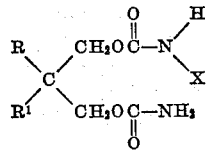

| X | R | $R^1$ | $PD_{50}$ | $LD_{50}$ |
|---|---|---|---|---|
| methyl | H | ethyl | >420 | >420 |
| propyl | H | phenyl | 305 | >420 |
| methyl | methyl | methyl | >620 | >620 |
| propyl | do | do | 420 | >420 |
| methyl | do | ethyl | 520 | 620 |
| propargyl | do | do | 510 | 1,002 |
| methyl | do | propyl | 290 | 730 |
| sec.-butyl | do | do | >420 | >420 |
| n-amyl | do | do | 450 | >940 |
| isoamyl | do | do | 620 | >940 |
| benzyl | do | do | >1,400 | >1,400 |
| 2-butenyl | do | do | 384 | >940 |
| methallyl | do | do | 253 | 900 |
| methyl | do | isopropyl | 520 | >620 |
| propyl | do | do | 236 | 765 |
| phenyl | do | do | >420 | >420 |
| n-butyl | do | n-butyl | 305 | 700 |
| phenyl | do | do | >620 | >620 |
| n-butyl | do | sec.-butyl | 420 | >420 |
| propyl | do | phenyl | 280 | 580 |
| propargyl | do | do | 530 | >940 |
| ethyl | ethyl | ethyl | 530 | >940 |
| propargyl | do | do | 305 | >420 |
| n-butyl | do | do | 255 | 820 |
| propyl | do | n-butyl | 420 | >420 |
| ethyl | do | phenyl | 280 | >280 |

TABLE III

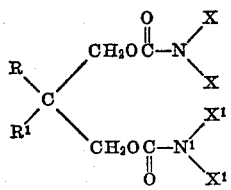

| R | $R^1$ | X | Y | $X^1$ | $Y^1$ | $PD_{50}$ | $LD_{50}$ |
|---|---|---|---|---|---|---|---|
| ethyl | H | methyl | methyl | H | H | 520 | >620 |
| methyl | methyl | do | do | H | H | 520 | >620 |
| Do | propyl | do | do | H | H | 570 | 900 |
| Do | do | ethyl | ethyl | H | H | 370 | 735 |
| Do | isopropyl | methyl | methyl | H | H | 420 | >420 |
| ethyl | phenyl | do | do | H | H | 420 | >420 |
| methyl | propyl | do | H | methyl | H | 315 | 730 |
| Do | do | ethyl | H | ethyl | H | 560 | 1,020 |
| Do | do | isopropyl | H | isopropyl | H | >620 | >620 |
| Do | do | n-butyl | H | isoamyl | H | >620 | >620 |
| Do | isopropyl | methyl | H | methyl | H | >620 | >620 |
| ethyl | ethyl | ethyl | H | ethyl | H | 457 | 800 |
| methyl | propyl | methyl | methyl | do | H | 420 | >420 |
| Do | do | ethyl | ethyl | do | H | >420 | >420 |
| Do | do | methyl | methyl | propyl | H | 420 | >420 |
| Do | do | ethyl | ethyl | ethyl | ethyl | conv | 940 |
| ethyl | ethyl | do | do | do | do | conv | 650 |

In evaluating the results reported in Table I, meprobamate (2-methyl-2-n-propyl-1,3-propanediol dicarbamate), a known muscle relaxant, is used for comparison purposes, meprobamate having a $PD_{50}$ value of 235 mgs./kg. and an $LD_{50}$ value of 800 mgs./kg. It is seen that all of the compounds of Table I possess enhanced muscle relaxant activity when compared to meprobamate, while all of the compounds of Table II and Table III are inferior to meprobamate as a muscle relaxant. From a study of the results reported in Tables I–III, it appears that the enhanced activity of the compounds of this invention, which are disclosed in Table I, appear to be dependent upon the substitution of an aliphatic group for one, and not more than one, of the four hydrogen atoms attached to the carbamate nitrogens. As evidenced by the results in Table I and Table III, it has been found that in general substituting aliphatic groups for more than one of the four hydrogens attached to the two carbamates of meprobamate decreases rather than enhances muscle relaxant activity.

Moreover, from a comparison of the results in Table I and in Table II, it is seen that not every N-substituted 2,2-dialkyl-1,3-propanediol dicarbamate has improved activity over meprobamate. The nature of the aliphatic group substituted on the N-atom affects the activity. Also the nature of the 2,2-dialkyl groups affects the activity. The unexpected improved muscle relaxant activity of the compounds of this invention is clearly shown by the fact that other members of the very specific class to which the compounds of this invention belong, i.e., N-monosubstituted-2,2-dialkyl-1,3-propanediol dicarbamates, possess muscle relaxant activity far inferior to that possessed by meprobamate, and, of course, even more inferior to the unique muscle relaxant activity of the compounds of this invention.

The compounds covered by this application are colorless liquids of high boiling point or low melting solids. They are soluble in most organic solvents but only slightly soluble in water at ordinary room temperature. They are readily hydrolyzed by hot caustic or strong acid solution to give the corresponding diol, ammonia, primary amine and carbon dioxide.

The compounds of this invention may be prepared by many different methods. One method involves reacting an appropriate N-substituted hydroxalkyl carbamate with a compound selected from the group consisting of a carbamate of a low boiling alcohol (e.g., an alcohol having 1 to 4 carbon atoms) and cyanic acid.

Cyanic acid is a compound formed by the treatment of an alkali cyanate with anhydrous hydrogen chloride. The N-substituted hydroxyalkyl carbamate employed in the above reactions may be prepared by any of the known methods, some of which are described hereinlater. Another method for producing the compounds of this invention involves the conversion of an appropriate N-unsubstituted hydroxyalkyl carbamate to the desired compound by reacting it with the appropriate organic isocyanate. The N-unsubstituted hydroxyalkyl carbamate used in this reaction may be prepared by any of the known methods, some of which are described hereinafter. Another method for preparing the compounds of this invention involves the phosgenation of the appropriate N-unsubstituted hydroxyalkyl carbamate followed by amidation using the desired primary amine.

In order to describe more particularly a number of methods which may be employed for producing both the intermediate N-substituted monocarbamates (i.e., hydroxyalkyl carbamates) and N-unsubstituted monocarbamates, as well as the compounds of this invention produced therefrom, the following explanation is given. In all instances, the compounds of this invention are prepared from the appropriate 2,2-dialkyl-1,3-propanediol by stepwise carbamation. One method of preparation of the compounds of this invention involves (a) conversion of the diol to the corresponding cyclic carbonate ester (m-dioxanone) using diethyl carbonate, (b) treatment of the cyclic carbonate ester with the appropriate amine $NH_2X$, either in aqueous solution or in the anhydrous form, to give the N-substituted monocarbamate, and (c) reaction of the latter compound with a carbamate of a low boiling alcohol such, for example, as urethane, in an ester exchange reaction to give the desired compound. These reactions are summarized in the following reaction scheme wherein R and $R^1$ are appropriate alkyl radicals.

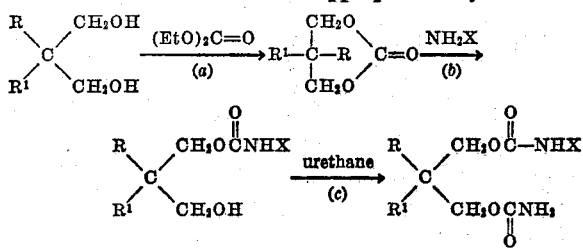

Alternatively the dicarbamate product of step (c) may be prepared by reacting the monocarbamate of step (b) with cyanic acid (HOCN).

The monocarbamate obtained from step (b) above may also be prepared by the controlled action of phosgene on the diol (d) followed by amidation with ammonia or the desired amine, $NH_2X(e)$:

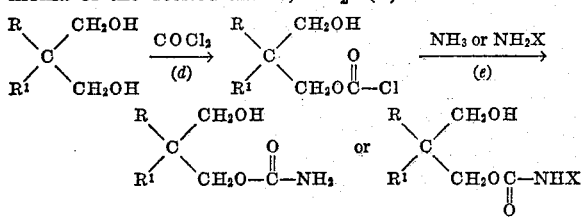

When the product of step (e) or the product of step (b) obtained by using ammonia is the N-unsubstituted amide it may be converted to the desired product by phosgenation (f) followed by amidation using the desired primary amine $NH_2X(g)$

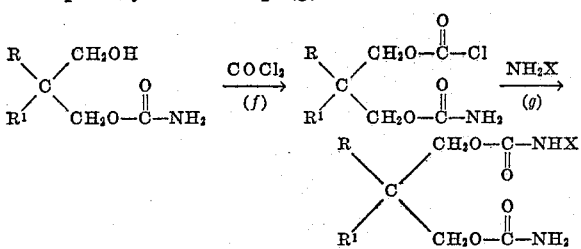

An alternative method for making the product of step (g) when the product of step (e) or step (b) is the N-unsubstituted amide is to react said monocarbamate with the appropriate aliphatic isocyanate (XCNO)(h):

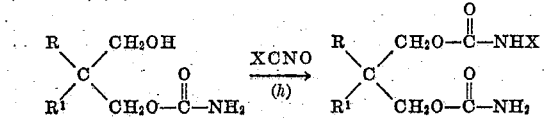

When the product of step (e) is the N-aliphatic amide, it may be converted to the final product by either the phosgenation-amidation steps (f) and (g) using ammonia as the amidation agent, or by an ester exchange reaction using a carbamate of a low boiling alcohol such, as for example, urethane, or by reacting the monocarbamate with cyanic acid (i).

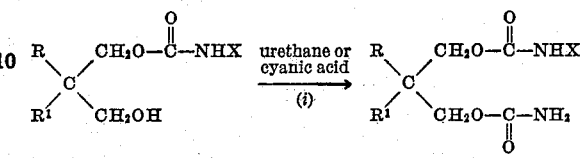

A further alternative method for preparing the compounds of this invention is the reaction of the N-unsubstituted monocarbamate with phenylchlorocarbonate to give the corresponding phenylcarbonate ester (reaction (j)). This compound is then reacted with the appropriate primary amine (step k) to give the desired N-substituted dicarbamate.

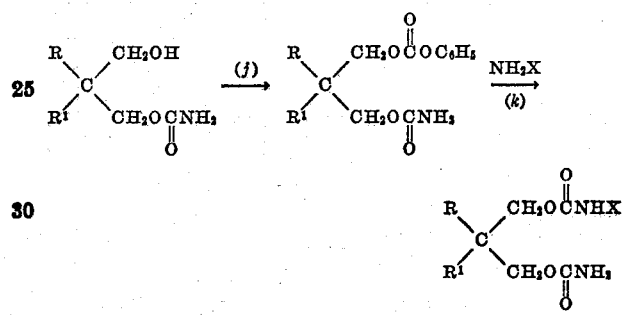

In order to illustrate the preparation of the compounds of this invention the following examples are given illustrating various methods of preparation. Unless otherwise indicated, the parts given are by weight. Examples A–J illustrate the preparation of intermediate compounds used for forming the novel compounds of this invention. Examples 1 to 17 illustrate the preparation of novel compounds of this invention.

Example A illustrates the preparation of the new 2,2-disubstituted-1,3-propanediols used as a starting material in obtaining some of the desired compounds. Example B illustrates the preparation of the intermediate 5,5-disubstituted-2-m-dioxanones by step (a) described above wherein the diol is converted to the cyclic carbonate ester using diethyl carbonate. Examples C–G illustrate the preparation of a number of intermediates of the compounds of this invention employing step (b) described above by treatment of the cyclic carbonate ester with an appropriate amine or ammonia to give the monocarbamate. Example H illustrates a method for preparing the intermediate chlorocarbonate by step (d) described above by controlled action of phosgene on the diol, while Examples I and J illustrate the preparation of the intermediate monocarbamate by amidation of the chlorocarbonate with the desired amine.

Example 1–7 illustrate the preparation of the compounds of this invention employing steps (c) and (i) described hereinbefore, i.e., reaction of N-substituted monocarbamate with a carbamate of a low boiling alcohol in an ester exchange reaction. Examples 8–11 illustrate different methods for the preparation of some of the compounds of this invention utilizing steps (f) and (g) described above. In Examples 8, 9 and 10 an N-unsubstituted monocarbamate is converted to the desired compound by phosgenation followed by amidation with the appropriate primary amine. In Example 11, the compound of Example 8 is obtained by phosgenation of the N-substituted monocarbamate and reaction of the monochlorocarbonate with ammonia. Example 12 illustrates a method for the preparation of one of the compounds of this invention employing step (h). In these examples, the N-unsubstituted monocarbamate is converted to the desired compound by reaction with an appropriate organic isocyanate. Examples 13, 14 and 15 illustrate a method for preparing one of the compounds of this invention employing step (i). In these examples an N-substituted monocarbamate is reacted with cyanic acid. Example 16 illustrates a method for preparing the compounds of the invention employing the reaction steps (j) and (k).

PREPARATION OF INTERMEDIATE COMPOUNDS

EXAMPLE A

*Preparation of 2-methyl-2-sec.-butyl-1,3-propanediol*

92 gms. of diethyl-sec.-butyl methyl malonate were reduced in the usual manner using 22.8 gms. of lithium aluminum hydride in a suitable volume of anhydrous ethyl ether. The mixture was treated with 10% sulfuric acid and the ether soluble components extracted. The ether solution was dried, using a suitable drying agent, and the residue obtained by the removal of the ether was purified by distilling under reduced pressure. This material was further purified by redistillation. Approximately 46 gms. of 2-methyl-2-sec.-butyl-1,3-propanediol were obtained as a clear colorless liquid, boiling point 92–97° C. (0.1 mm. pressure). Refractive index, $N_D^{26}$ =1.4587. Solubility in water approximately 0.5%. Analysis, calculated for $C_8H_{18}O_2$; C, 65.7%; H, 12.4%. Found: C, 66.1%; H, 12.1%.

2-ethyl-2-propyl-1,3-propanediol was prepared as described above from diethyl ethyl propyl malonate. The purified product melted at 37–39° C.

EXAMPLE B

*Preparation of 5-methyl-5-propyl-2-m-dioxanone*

132 parts of 2-methyl-2-propyl-1,3-propanediol and 113 parts of diethyl carbonate were mixed in a suitable vessel equipped with an efficient distillation column. The mixture was freed from moisture by distillation of a small portion of the diethyl carbonate. After cooling, approximately one part of sodium ethylate was added. Distillation was continued until substantially the theoretical quantity of ethanol was distilled at about 78° C. A further quantity of 10 parts of diethyl carbonate was added and distillation continued until ethanol removal was complete. The mixture was cooled and diluted with an equal volume of diethyl ether. This solution was washed with dilute hydrochloric acid saturated with sodium chloride and then with water. It was dried using a suitable drying agent and the solvent removed. The residue was distilled under reduced pressure. The fraction distilling at 125–130° at about 0.1 mm. was collected as a clear, colorless, oily liquid. Refractive index, $N_D^{25}$=1.4506. A yield of 80% of the theoretical amount of 5-methyl-5-propyl-2-m-dioxanone was obtained.

Other 5,5-disubstituted-2-m-dioxanones prepared by this method are as follows:

| Compound | $N_D^{25}$ | Distillation Temp. (° C.)—Pressure (mm.) |
|---|---|---|
| 5-methyl-5-ethyl-2-m-dioxanone | 1.4540 | 90–93° (0.02). |
| 5-methyl-5-isopropyl-2-m-dioxanone | | M.P., 96–97°. |
| 5-methyl-5-n-butyl-2-m-dioxanone | 1.4552 | 95–97° (0.07). |
| 5-methyl-5-sec.-butyl-2-m-dioxanone | 1.4639 | 127–128° (0.08). |
| 5-ethyl-5-propyl-2-m-dioxanone | 1.4590 | 90–95° (0.06). |
| 5-ethyl-5-isopropyl-2-m-dioxanone | 1.4640 | 91–94° (0.06). |

EXAMPLE C

*Preparation of 2-methyl-2-propyl-3-hydroxypropyl carbamate*

5 parts of 5-methyl-5-propyl-2-m-dioxanone and 7.5 parts of liquid ammonia were placed in a cooled stainless steel pressure bomb and the vessel sealed. The vessel was permitted to warm to room temperature and allowed to remain at this temperature with occasional shaking for 24 to 48 hours. The vessel was cooled, opened, and the excess ammonia allowed to evaporate. The monocarbamate which was obtained as a low melting solid was purified by crystallization from a toluene-ligroin mixture. Approximately four parts of the purified product were obtained in the form of a colorless crystalline solid, slightly soluble in water, melting point 61.5–62.5° C.

Other N-unsubstituted monocarbamates prepared by the method of this example are as follows:

| Compound | Melting Point, degrees |
|---|---|
| 2-methyl-2-ethyl-3-hydroxypropyl carbamate | 43–45 |
| 2-methyl-2-isopropyl-3-hydroxypropyl carbamate | 73–74 |
| 2-methyl-2-n-butyl-3-hydroxypropyl carbamate | 65–66 |
| 2-ethyl-2-isopropyl-3-hydroxypropyl carbamate | 58–60 |

EXAMPLE D

*Preparation of N-propyl-2-methyl-2-propyl-3-hydroxypropyl carbamate*

55 parts of 5-methyl-5-propyl-2-m-dioxanone and 41 parts of n-propylamine were mixed in a suitable vessel equipped with a reflux condenser. The mixture was heated slowly and permitted to reflux for two hours. The excess amine was removed by distillation and the residue distilled under reduced pressure. The fraction boiling at 114–117° C. at 0.02 mm. was collected in a yield of 80% of theoretical. This product was a viscous, colorless oily liquid, boiling point 114–117° C. (0.02 mm. pressure). Refractive index, $N_D^{25}$=1.4579.

EXAMPLE E

*Preparation of N-ethyl-2-methyl-2-propyl-3-hydroxypropyl carbamate*

158 parts of 5-methyl-5-propyl-2-m-dioxanone were stirred at room temperature with 75 parts of a 70% solution of ethylamine in water, until reaction was complete. The excess amine was removed by dissolving the mixture in ether and extracting with dilute hydrochloric acid. The ether was removed from the organic layer and the residue purified by distillation at reduced pressure. The fraction distilling at 110–112° at 0.02 mm. was collected. Refractive index, $N_D^{25}$=1.4589.

EXAMPLE F

*Preparation of N-isobutyl-2-methyl-2-propyl-3-hydroxypropyl carbamate*

55 parts of 5-methyl-5-propyl-2-m-dioxanone, 51 parts of isobutylamine and 75 parts ethanol are permitted to remain at room temperature overnight. The ethanol and excess amine are then removed by distillation under reduced pressure. The oily residue remaining is dissolved in ethyl ether and extracted with dilute hydrochloric acid to remove the remaining amine and then extracted with water. The ether solution is dried over a suitable drying agent and freed from solvent by evaporation. The crude N - isobutyl - 2 - methyl - 2 - propyl - 3 - hydroxypropyl carbamate is purified by distillation under reduced pressure; the fraction boiling at 118–119° C. at 0.06 mm. pressure is collected. A yield of 50 parts (62% of theoretical) of purified compound is obtained. Refractive index, $N_D^{25}$=1.4586.

EXAMPLE G

*Preparation of N-allyl-2-methyl-2-propyl-3-hydroxypropyl carbamate*

55 parts of allylamine are added slowly with stirring to 52 parts of 5-methyl-5-propyl-2-m-dioxanone. After addition is completed, the reaction mixture is heated for two hours on a steam bath. The excess allylamine is then removed by distillation under reduced pressure and the residue purified by vacuum distillation. A yield of 40 parts of purified product distilling at 102–104° C. at 0.05 mm. pressure is obtained. Refractive index, $N_D^{25}$ =1.4683.

Additional N-substituted monocarbamates prepared by the method given in Examples D–G above are as follows:

| Compound | $N_D^{25}$ | Distillation Temp., °C. (Pressure mm.) |
|---|---|---|
| N-isopropyl-2-methyl-2-propyl-3-hydroxypropyl carbamate | 1.4543 | 86–88 (0.01) |
| N-n-butyl-2-methyl-2-propyl-3-hydroxypropyl carbamate | 1.4579 | 107–108 (0.01) |
| N-propargyl-2-methyl-2-propyl-3-hydroxypropyl carbamate | 1.4663 | 120–125 (0.06) |
| N-methyl-2-methyl-2-n-butyl-3-hydroxypropyl carbamate | 1.4592 | 96–99 (0.04) |
| N-isopropyl-2-methyl-2-sec.-butyl-3-hydroxypropyl carbamate | 1.4631 | 126–128 (0.07) |
| N-propargyl-2-methyl-2-sec.-butyl-3-hydroxypropyl carbamate | 1.4790 | 123–126 (0.04) |
| N-methyl-2-ethyl-2-n-butyl-3-hydroxypropyl carbamate | 1.4645 | 128–130 (0.06) |
| N-propyl-2-methyl-2-sec.-butyl-3-hydroxypropyl carbamate | 1.4655 | 127–132 (0.07) |
| N-allyl-2-methyl-2-sec.-butyl-3-hydroxypropyl carbamate | 1.4742 | 147–148 (0.07) |
| N-propyl-2-ethyl-2-ethyl-3-hydroxypropyl carbamate | 1.4639 | 130–131 (0.02) |
| N-isopropyl-2-ethyl-2-propyl-3-hydroxypropyl carbamate | 1.4619 | 130–132 (0.5) |

EXAMPLE H

*Preparation of 2-methyl-2-propyl-3-hydroxypropyl chlorocarbonate*

A cooled 10% solution of 1 mole of phosgene in toluene was added with stirring to a cooled solution of 1 mole of 2-methyl-2-propyl-1,3-propanediol and 2 moles of dimethylaniline also dissolved in toluene, at such a rate that the temperature of the mixture was maintained at about 25° C. The mixture was allowed to remain at this temperature for several hours, then cooled and extracted with cold 5% hydrochloric acid solution to remove the dimethylaniline. The toluene layer was dried using a suitable drying agent and the chlorocarbonate used in subsequent reactions in the form of its solution in anhydrous toluene.

EXAMPLE I

*Preparation of N-n-butyl-2-methyl-2-propyl-3-hydroxypropyl carbamate*

A quantity of solution obtained as described in Example H containing 0.1 mole of the chlorocarbonate was treated with 0.2 mole of anhydrous n-butylamine and allowed to react at ordinary room temperature. The solution was cooled, extracted with dilute hydrochloric acid and the organic layer concentrated by evaporation of the solvent. The crude monocarbamate was purified by distilling at 107–108° at about 0.01 mm. It was a clear, viscous liquid. Refractive index, $N_D^{25}$=1.4579.

EXAMPLE J

*Preparation of N-isopropyl-2-methyl-2-propyl-3-hydroxypropyl carbamate*

This compound was prepared from 2-methyl-2-propyl-3-hydroxypropyl chlorocarbonate and isopropyl amine by the method used in Example I. This compound is a liquid having a boiling point of 86–88° C. (0.01 mm. pressure). Refraction index, $N_D^{25}$=1.4543.

PREPARATION OF COMPOUNDS OF THIS INVENTION

EXAMPLE 1

*Preparation of N-propyl-2-methyl-2-propyl-1,3-propanediol dicarbamate*

22 parts of N-propyl-2-methyl-2-propyl-3-hydroxypropyl carbamate and 10 parts of ethyl urethane were dissolved in 250 parts of anhydrous xylene in a suitable vessel equipped with an efficient distillation column. Two parts of aluminum isopropylate were added and the mixture heated to boiling and distillation continued until substantially the theoretical quantity of ethanol had been distilled in the form of an azeotrope with xylene. The bulk of the solvent was removed by distillation under reduced pressure. 100 parts of water were added and distilled under reduced pressure to remove the final traces of xylene. 50 parts of isopropanol were added and distilled to remove residual water, and the residue taken up in 100 parts isopropanol. The solution was clarified by filtration, concentrated by evaporation of the isopropanol and the residue subjected to distillation under reduced pressure. The fraction distilling at 144–147° at 0.02 mm., was collected. This product was obtained in a yield of 72% of theoretical in the form of a somewhat viscous, clear, oily liquid having the properties listed in Table I.

EXAMPLE 2

*Preparation of N-isopropyl-2-methyl-2-propyl-1,3-propanediol dicarbamate*

One mole of N-isopropyl-2-methyl-2-propyl-3-hydroxypropyl carbamate and 1.1 moles of ethyl urethane were reacted in an ester interchange reaction as described in Example 1. The product obtained on removal of the isopropanol solvent was recovered as a crystalline solid which was purified by recrystallization from aqueous isopropanol solution. It had the properties and analysis as listed in Table I.

EXAMPLE 3

*Preparation of N-n-butyl-2-methyl-2-propyl-1,3-propanediol dicarbamate*

This compound was prepared from N-n-butyl-2-methyl-2-propyl-3-hydroxypropyl carbamate and ethyl urethane by the method described in Example 1. The properties and analysis of the purified product are listed in Table I.

EXAMPLE 4

*Preparation of N-ethyl-2-methyl-2-propyl-1,3-propanediol dicarbamate*

22 parts of N-ethyl-2-methyl-2-propyl-3-hydroxypropyl carbamate were reacted in an ester exchange reaction with 15 parts of ethyl urethane using aluminum isopropylate as catalyst in anhydrous xylene as described in Example 1. The product obtained had the properties and analysis as listed in Table I.

EXAMPLE 5

*Preparation of N-isobutyl-2-methyl-2-propyl-1,3-propanediol dicarbamate*

22.1 parts of N-isobutyl-2-methyl-2-propyl-3-hydroxypropyl carbamate and 9.8 parts of urethane are dissolved in 300 parts of anhydrous xylene in a suitable vessel equipped with an efficient distillation column. Xylene is distilled to remove traces of water from the mixture. 2.3 parts of aluminum isopropylate are added and distillation is continued until substantially the theoretical quantity of ethanol has been distilled at about 78° C. The reaction mixture is then freed from xylene by distillation under reduced pressure. Approximately 100 parts of water are added and the mixture again freed of solvent by distillation under reduced pressure. 100 parts of trichloroethylene are added, the solution filtered to remove insoluble matter and the solution freed of solvent by evaporation. The residual oil is purified by molecular distillation at a pressure of about 0.01 mm. 8.7 parts (35% of theoretical yield) of purified N-isobutyl-2-methyl-2-propyl-1,3-propanediol dicarbamate are obtained in the form of a viscous colorless oil having the analytical values and physical constants listed in Table I.

EXAMPLE 6

*Preparation of N-allyl-2-methyl-2-propyl-1,3-propanediol dicarbamate*

A solution of 18.1 parts of N-allyl-2-methyl-2-propyl-3-hydroxypropyl carbamate, 8.9 parts of urethane and 200 parts of xylene are distilled to remove all traces of residual water. The mixture is allowed to cool and one part of aluminum isopropylate is added. The mixture is distilled until substantially the theoretical quantity of alcohol has been removed in the form of its azeotrope with xylene. The xylene is removed by distillation under reduced pressure and 100 parts of water are added. The water is distilled under reduced pressure and the residue dissolved in 150 parts of isopropanol. The insoluble material is removed by filtration and the isopropanol removed by distillation. The residual oil is purified by molecular distillation using a bath temperature of about 110–135° and a pressure of about 0.025 mm. A yield of 14 parts of purified product is obtained having the analytical values and physical constants given in Table I.

EXAMPLE 7

*Preparation of N-propargyl-2-methyl-2-propyl-1,3-propanediol dicarbamate*

N-propargyl-2-methyl-2-propyl-3-hydroxypropyl carbamate and urethane were reacted in an ester exchange reaction as described in Example 6. The product was purified by molecular distillation and the purified compound had the physical constants and analytical values given in Table I.

Other compounds prepared by this ester exchange reaction were, N-propyl-2,2-diethyl-1,3-propanediol dicarbamate and N-methyl-2-ethyl-2-n-butyl-1,3-propanediol dicarbamate. The physical constants and analytical data for these compounds appear in Table I.

EXAMPLE 8

*Preparation of N-propyl-2-methyl-2-propyl-1,3-propanediol dicarbamate*

A cooled 10% solution of 0.1 mole of phosgene in toluene was added with stirring to a cooled solution of 0.1 mole of 2-methyl-2-propyl-3-hydroxypropyl carbamate and 0.11 mole of pyridine also dissolved in toluene, at such a rate that the temperature of the mixture was maintained at about 0 to 5° C. The mixture was allowed to warm 25° and was stirred for several hours. The pyridine hydrochloride was filtered off, the toluene was removed by distillation under reduced pressure and the residue dissolved in anhydrous ether. The solution was filtered and the chlorocarbonate used in the subsequent reactions in the form of its solution in anhydrous ether. To this solution there was added 0.2 mole of propylamine and the mixture was allowed to react at room temperature. The excess amine was removed by extracting with dilute hydrochloric acid solution, and the ether layer concentrated by evaporation of the solvent. The residue was purified by distillation under reduced pressure giving a product identical to that obtained in Example 1.

EXAMPLE 9

*Preparation of N-allyl-2-methyl-2-isopropyl-1,3-propanediol dicarbamate*

2-methyl-2-isopropyl-3-hydroxypropyl carbamate was converted to its chlorocarbomate derivative employing phosgene and pyridine as described in Example 8. A solution of this chlorocarbonate in ether was treated at room temperature with allylamine and the mixture allowed to react at room temperature. The excess amine was removed by extraction with dilute hydrochloric acid and the isolation and purification effected as described in Example 8. The product obtained possessed the physical constants and analytical values as indicated in Table I.

EXAMPLE 10

*Preparation of N-propargyl-2-ethyl-2-n-butyl-1,3-propanediol dicarbamate*

2-ethyl-2-n-butyl-3-hydroxypropyl carbamate was converted to its chlorocarbonate and then by treatment with propargyl amine to the N-propargyl dicarbamate as described in Example 8. The purified product had the properties and analytical values given in Table I.

Other compounds prepared by this procedure were N-allyl and N-propargyl dicarbamates of 2-methyl-2-n-butyl-1,3-propanediol, N-n-butyl-2-methyl-2-isopropyl-1,3-propanediol dicarbamate, N-isopropyl-2,2-diethyl-1,3-propanediol dicarbamate and N-isopropyl-2-ethyl-2-isopropyl-1,3-propanediol dicarbamate. These compounds possess the physical properties and analytical values given in Table I.

EXAMPLE 11

*Preparation of N-propyl-2-methyl-2-propyl-1,3-propanediol dicarbamate*

N-propyl-2-methyl-2-propyl-3-hydroxypropyl carbamate was converted to its chlorocarbonate derivative employing phospene and pyridine as described in Example 8. A solution of this chlorocarbonate in ether was treated at room temperature with an excess of dry ammonia gas by bubbling the gas into the stirred solution of the chlorocarbonate while cooling. The mixture was allowed to warm to room temperature and stirred for about one hour. The excess ammonia was removed by extracting with dilute hydrochloric acid and the isolation and purification effected as described in Example 8. The product obtained was identical to that obtained in Examples 1 and 8.

EXAMPLE 12

*Preparation of N-n-butyl-2-methyl-2-propyl-1,3-propanediol dicarbamate*

175 parts of 2-methyl-2-propyl-3-hydroxypropyl carbamate and 108 parts of n-butyl isocyanate are added to 1250 parts of anhydrous benzol and the mixture boiled under reflux for about 8 hours. The solvent is removed by distillation under reduced pressure and the residue dissolved in approximately 1800 parts of warm trichloroethylene-hexane (1:2) solvent. On cooling, the product separates in the form of colorless crystals, which after removal from the solvent and drying, melts at 49 to 51° C. The yield of the purified compound is about 80% of theoretical. Analysis: Calculated for $$C_{13}H_{26}O_4N_2$$

nitrogen 10.21%; Found: nitrogen 10.42%. This compound may also be purified by distillation under reduced pressure. The compound distills at approximately 150–152° C. at a pressure of 0.06 mm. The product obtained by distillation can be converted to a crystalline solid by subjecting it to the crystallization procedure indicated above.

Other compounds prepared using this procedure were N-propyl-2-methyl-2-ethyl-1,3-propanediol dicarbamate, N-isopropyl-2-methyl-2-ethyl-1,3-propanediol dicarbamate, N-n-butyl-2-methyl-2-ethyl-1,3-propanediol dicarbamate and N-propyl-2-methyl-2-n-butyl-1,3-propanediol dicarbamate.

EXAMPLE 13

*Preparation of N-isopropyl-2-methyl-2-propyl-1,3-propanediol dicarbamate*

21.7 grams (0.1 mole) of N-isopropyl-2-methyl-2-propyl-3-hydroxypropyl carbamate and 7.5 grams (0.11 mole) of anhydrous sodium cyanate are stirred in 200 mls. anhydrous chloroform in a suitable vessel equipped with a gas inlet tube, stirrer and thermometer. While cooling the vessel, anhydrous hydrogen chloride is passed into the stirred mixture slowly for 5 hours maintaining the temperature between 0 and 5° C. The mixture is then allowed to stand at room temperature overnight. The solid material is separated by filtration and the chloroform solution concentrated to an oil under reduced pressure. The oil is dissolved in 50 mls. of trichloroethylene, the solution treated with charcoal, filtered and the filtrate added to 125 ml. of hexane. The crystalline material which forms on standing at refrigerator temperature is removed by filtration, washed with light petroleum ether and dried at about 50° C. Approximately 20 grams of product are obtained. On recrystallizing from trichloroethylene-hexane, 17.8 grams of purified compound are obtained, melting point 89–91° C. The product from this reaction is identical to that obtained from the reaction described in Example 2.

Other compounds prepared by the cyanic acid method were N-methyl-2-methyl-2-n-butyl-1,3-propanediol dicarbamate and N-propyl-2-methyl-2-sec.-butyl-1,3-propanediol dicarbamate, N-isopropyl-2-methyl-2-sec.-butyl-1,3-propanediol dicarbamate and N-isopropyl-2-ethyl-2-propyl-1,3-propanediol dicarbamate. These compounds have the physical properties and analytical values given in Table 1.

Example 14

*Preparation of N-allyl-2-methyl-2-sec.-butyl-1,3-propanediol dicarbamate*

0.1 mole of N-allyl-2-methyl-2-sec.-butyl-3-hydroxypropyl carbamate and 0.11 mole of anhydrous sodium cyanate are reacted in chloroform through the action of anhydrous hydrogen chloride as described in Example 13. The product was purified by molecular distillation and had the physical properties and analytical values as given in Table 1.

Example 15

*Preparation of N-propargyl-2-methyl-2-sec.-butyl-1,3-propanediol dicarbamate*

This compound was prepared from the corresponding N-propargyl monocarbamate and cyanic acid following the procedure described in Example 13. The product, purified by molecular distillation, had the analytical values and physical constants as given in Table 1.

Example 16

*Preparation of N-allyl-2,2-diethyl-1,3-propanediol dicarbamate*

To 17.5 grams of 2,2-diethyl-3-hydroxypropyl carbamate and 9.5 grams of pyridine in 150 ml. of dichloromethane there was added slowly with stirring 17.1 grams of phenylchlorocarbonate in 50 ml. of dichloromethane. After permitting the reaction to proceed for two hours at room temperature the solvent was removed under reduced pressure. The liquid residue was heated under reflux for six hours with 50 ml. of 50% aqueous allylamine. The resulting mixture was concentrated under reduced pressure, the residue dissolved in ether was extracted with dilute hydrochloric acid and then with aqueous potassium carbonate solution and dried over anhydrous potassium carbonate. The solvent was removed and the residue crystallized by addition of a hexane-ether mixture. 12 grams of purified product were obtained having the analytical values and physical constants given for this compound in Table 1.

Also prepared by this method were N-allyl-2-methyl-2-ethyl-1,3-propanediol dicarbamate and N-isopropyl-2-methyl-2-n-butyl-1,3-propanediol dicarbamate. These compounds have the physical constants and analytical values as given in Table 1.

In addition to possessing unique muscle relaxant action so as to be extremely useful as a drug for the relief of muscle spasm, the marked central depressant properties and the hypotensive action of the compounds of this invention suggest that some of these compounds may be of further therapeutic value as tranquilizers, sedatives, hypnotics and agents influencing abnormal behavior and relieving high blood pressure.

The novel compounds of this invention are preferably administered orally in the form of pills, tablets, capsules or solutions formed by well known methods. When the active ingredient is in the form of a solid, a typical tablet composition comprises 0.5 gram of active ingredient, intermixed in a dry pulverulent state with gelatin, starch, magnesium stearate and alginic acid, pressed into a tablet. If the active ingredient is in the form of a liquid, it is dissolved in a suitable solvent. In general, an effective dose of the active ingredient is in the range of about 0.05 gram to about 2 grams.

This application is a continuation-in-part of application Ser. No. 729,235, filed April 18, 1958, which in turn is a continuation-in-part of application Ser. No. 654,664, filed April 24, 1957, both now abandoned.

What is claimed is:

1. The N-monosubstituted-2,2-dialkyl-1,3 - propanediol dicarbamate selected from the group consisting of N-propyl-2-methyl-2-ethyl-1,3-propanediol dicarbamate,
N-isopropyl-2-methyl-2-ethyl-1,3 - propanediol dicarbamate,
N-n-butyl-2-methyl-2-ethyl-1,3-propanediol dicarbamate,
N-allyl-2-methyl-2-ethyl-1,3-propanediol dicarbamate,
N-ethyl-2-methyl-2-propyl-1,3-propanediol dicarbamate,
N-propyl-2-methyl-2-propyl-1,3-propanediol dicarbamate,
N-isopropyl-2-methyl-2-propyl-1,3-propanediol dicarbamate,
N-n-butyl-2-methyl-2-propyl-1,3-propanediol dicarbamate,
N-isobutyl-2-methyl-2-propyl-1,3 - propanediol dicarbamate,
N-allyl-2-methyl-2-propyl-1,3-propanediol dicarbamate,
N-propargyl-2-methyl-2-propyl-1,3-propanediol dicarbamate,
N-isopropyl-2-methyl-2-isopropyl-1,3 - propanediol dicarbamate,
N-n-butyl-2-methyl-2-isopropyl - 1,3 - propanediol dicarbamate,
N-allyl-2-methyl-2-isopropyl-1,3 - propanediol dicarbamate,
N-methyl-2-methyl-2-n-butyl-1,3 - propanediol dicarbamate,
N-propyl-2-methyl-2-n-butyl-1,3-propanediol dicarbamate,
N-isopropyl-2-methyl-2-n-butyl-1,3-propanediol dicarbamate,
N-allyl-2-methyl-2-n-butyl-1,3-propanediol dicarbamate,
N-propargyl-2-methyl-2-n-butyl - 1,3 - propanediol dicarbamate,
N-propyl-2-methyl-2-sec.butyl-1,3 - propanediol dicarbamate,
N-isopropyl-2-methyl-2-sec.butyl - 1,3 - propanediol dicarbamate,
N-allyl-2-methyl-2-sec.butyl-1,3-propanediol dicarbamate,
N-propargyl-2-methyl-2-sec.butyl-1,3 - propanediol dicarbamate,
N-propyl-2-ethyl-2-ethyl-1,3-propanediol dicarbamate,
N-isopropyl-2-ethyl-2-ethyl-1,3-propanediol dicarbamate,
N-allyl-2-ethyl-2-ethyl-1,3-propanediol dicarbamate,
N-isopropyl-2-ethyl-2-n-propyl-1,3-propanediol dicarbamate,
N-isopropyl-2-ethyl-2-isopropyl - 1,3 - propanediol dicarbamate,
N-methyl-2-ethyl-2-n-butyl-1,3 - propanediol dicarbamate, and
N-propargyl-2-ethyl-2-n-butyl-1,3 - propanediol dicarbamate.

2. N-isopropyl-2-methyl-2-propyl - 1,3 - propanediol dicarbamate.

3. N-n-butyl-2-methyl-2-propyl-1,3 - propanediol dicarbamate.

4. N-allyl-2-methyl-2-propyl-1,3-propanediol dicarbamate.

5. N-propargyl-2-methyl-2-propyl-1,3 - propanediol dicarbamate.

6. N-propargyl-2-methyl-2-n-butyl-1,3 - propanediol dicarbamate.

7. The method of relaxing muscles of an animal comprising administering internally to the animal a compound selected from the group consisting of N-propyl-2-methyl-2-ethyl-1,3-propanediol dicarbamate,
N-isopropyl-2-methyl-2-ethyl-1,3 - propanediol dicarbamate,
N-n-butyl-2-methyl-2-ethyl-1,3-propanediol dicarbamate,
N-allyl-2-methyl-2-ethyl-1,3-propanediol dicarbamate,
N-ethyl-2-methyl-2-propyl-1,3-propanediol dicarbamate,
N-propyl-2-methyl-2-propyl-1,3-propanediol dicarbamate,
N-isopropyl-2-methyl-2-propyl-1,3-propanediol dicarbamate,
N-n-butyl-2-methyl-2-propyl-1,3-propanediol dicarbamate,
N-isobutyl-2-methyl-2-propyl-1,3 - propanediol dicarbamate,
N-allyl-2-methyl-2-propyl-1,3-propanediol dicarbamate,
N-propargyl-2-methyl-2-propyl-1,3-propanediol dicarbamate,
N-isopropyl-2-methyl-2-isopropyl-1,3 - propanediol dicarbamate,
N-n-butyl-2-methyl-2-isopropyl - 1,3 - propanediol dicarbamate,
N-allyl-2-methyl-2-isopropyl-1,3-propanediol dicarbamate,
N-methyl-2-methyl-2-n-butyl-1,3 - propanediol dicarbamate,
N-propyl-2-methyl-2-n-butyl-1,3 - propanediol dicarbamate,
N-isopropyl-2-methyl-2-n-butyl-1,3-propanediol dicarbamate,
N-allyl-2-methyl-2-n-butyl-1,3-propanediol dicarbamate,
N-propargyl-2-methyl-2-n-butyl - 1,3 - propanediol dicarbamate,
N-propyl-2-methyl-2-sec.butyl-1,3 - propanediol dicarbamate,
N-isopropyl-2-methyl-2-sec.butyl - 1,3 - propanediol dicarbamate,
N-allyl-2-methyl-2-sec.butyl-1,3-propanediol dicarbamate,
N-propargyl-2-methyl-2-sec.butyl-1,3 - propanediol dicarbamate,
N-propyl-2-ethyl-2-ethyl-1,3-propanediol dicarbamate,
N-isopropyl-2-ethyl-2-ethyl-1,3-propanediol dicarbamate,
N-allyl-2-ethyl-2-ethyl-1,3-propanediol dicarbamate,
N-isopropyl-2-ethyl-2-n-propyl-1,3-propanediol dicarbamate,
N-isopropyl-2-ethyl-2-isopropyl - 1,3 - propanediol dicarbamate,
N-methyl-2-ethyl-2-n-butyl-1,3 - propanediol dicarbamate, and
N-propargyl-2-ethyl-2-n-butyl-1,3 - propanediol dicarbamate, said compound being in an amount which is non-toxic and sufficient to exert muscle relaxant activity.

References Cited in the file of this patent
OTHER REFERENCES

| | | |
|---|---|---|
| 2,197,479 | Meigs | Apr. 16, 1940 |
| 2,697,720 | Kaiser | Dec. 21, 1954 |
| 2,724,720 | Berger | Nov. 22, 1955 |

OTHER REFERENCES

Sidgwick's Organic Chemistry of Nitrogen (1949), page 332.

UNITED STATES PATENT OFFICE
CERTIFICATION OF CORRECTION

Patent No. 2,937,119                        May 17, 1960

Frank M. Berger et al.

It is hereby certified that error appears in the above numbered patent requiring correction and that the said Letters Patent should read as corrected below.

Column 3, under the heading TABLE III, the formula should appear as shown below instead as in the patent:

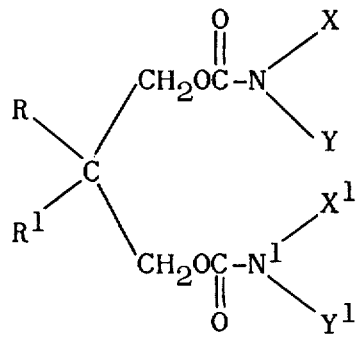

Signed and sealed this 24th day of October 1961.

(SEAL)
Attest:

ERNEST W. SWIDER                           DAVID L. LADD
Attesting Officer                         Commissioner of Patents